United States Patent
Batra

[19]

[11] Patent Number: 6,105,067

[45] Date of Patent: Aug. 15, 2000

[54] CONNECTION POOL MANAGEMENT FOR BACKEND SERVERS USING COMMON INTERFACE

[75] Inventor: Virinder Mohan Batra, Chapel Hill, N.C.

[73] Assignee: International Business Machines Corp., Armonk, N.Y.

[21] Appl. No.: 09/092,928

[22] Filed: Jun. 5, 1998

[51] Int. Cl.[7] ................................................. G06F 13/00
[52] U.S. Cl. .......................... 709/227; 709/102; 709/203; 709/219
[58] Field of Search ................................... 709/102, 104, 709/105, 201, 202, 203, 217, 219, 223, 224, 225, 226, 227, 228, 300, 302

[56] References Cited

U.S. PATENT DOCUMENTS

| | | | |
|---|---|---|---|
| 5,519,707 | 5/1996 | Subramanian et al. | 370/94.2 |
| 5,553,239 | 9/1996 | Heath et al. | 395/187.01 |
| 5,553,242 | 9/1996 | Russell et al. | 395/200.12 |
| 5,617,540 | 4/1997 | Civanlar et al. | 709/227 |
| 5,682,478 | 10/1997 | Watson et al. | 395/200 |
| 5,812,819 | 9/1998 | Rodwin et al. | 395/500.44 |
| 5,894,554 | 4/1999 | Lowery et al. | 707/10 |
| 5,898,761 | 4/1999 | McHale et al. | 379/93.01 |
| 5,958,014 | 9/1999 | Cave | 709/229 |

FOREIGN PATENT DOCUMENTS

| | | | |
|---|---|---|---|
| 0794490 | 1/1997 | United Kingdom | G06F 9/46 |
| 2333868 | 12/1998 | United Kingdom | H04L 29/06 |

*Primary Examiner*—Viet D. Vu
*Attorney, Agent, or Firm*—A. Bruce Clay; Marcia L. Doubet

[57] ABSTRACT

A technique, system, and computer program for enhancing performance of the computers in a Web environment. This is done by creating a pool of connections between a Web server and backend data servers, reducing the overhead required for accessing the data servers and enabling the applications running on the Web server to be faster. Many different types of connections may be maintained concurrently in the pool, to similar or different data servers. A common interface to the pool is used, regardless of the type of backend data server connection, making programs which use the pool easier (and therefore less costly) to write and support. Options are defined for optimizing the number of connections in the pool.

15 Claims, 6 Drawing Sheets

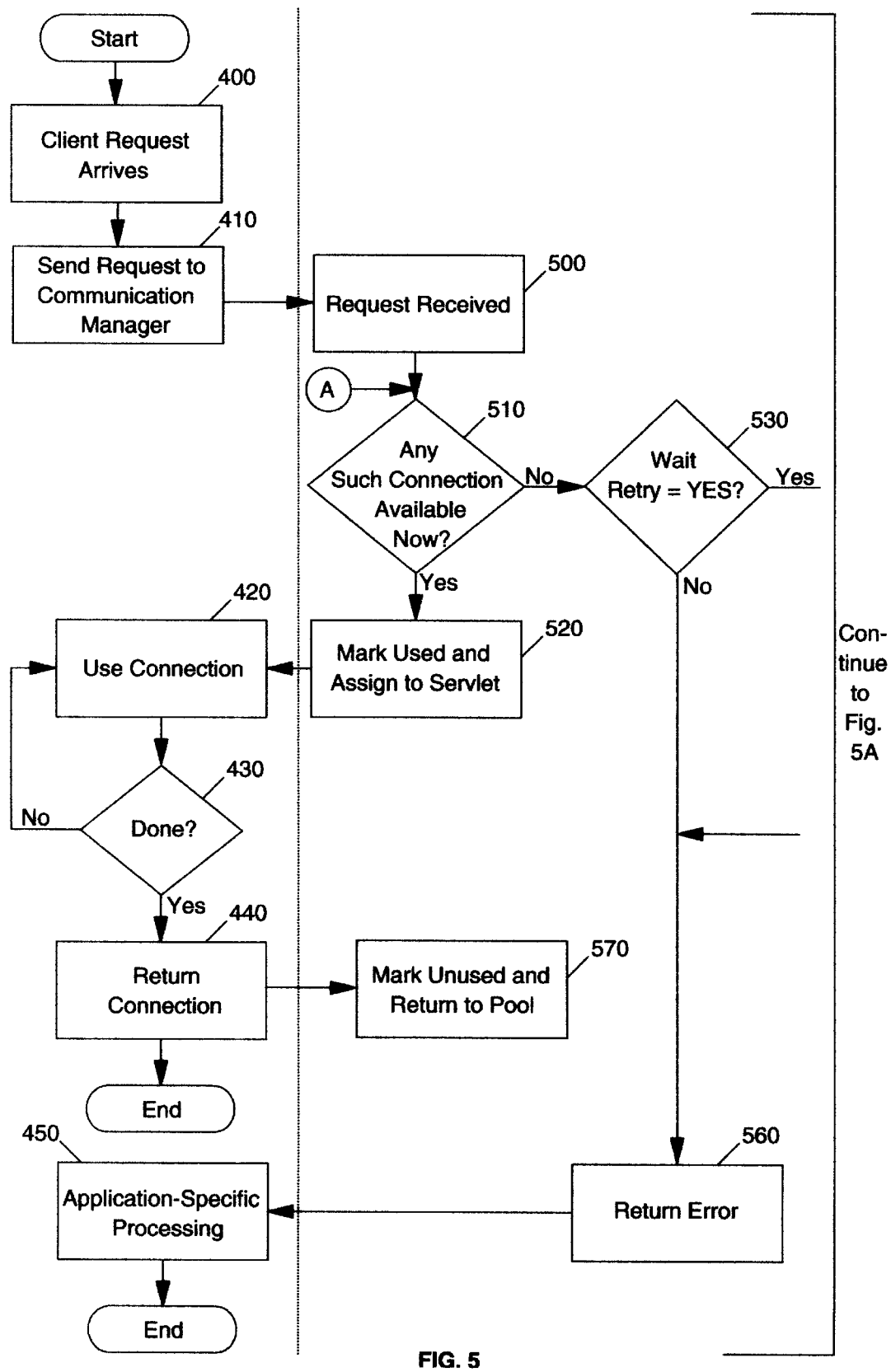

CONNECTION POOL MANAGEMENT FOR BACKEND SERVERS USING COMMON INTERFACE

BACKGROUND OF THE INVENTION

1. Field of the Invention

The present invention relates to computer communication, and deals more particularly with a technique, system, and computer program for enhancing performance of the computers in a Web environment. This is done by creating a pool of connections between a Web server and backend data servers, reducing the overhead required for accessing the data servers and enabling the applications running on the Web server to be faster. A common interface to the pool is used, regardless of the type of backend data server connection, making programs which use the pool easier (and therefore less costly) to write and support.

2. Description of the Related Art

The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added third tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server", reflecting the fact that this middle tier is where the business logic of the application typically resides, and the computers on which the data repositories reside may be referred to as "data servers", or "backend data servers". A data server stores and manages the data that is used by an application, and as used herein, includes the software products that are used in storing, accessing, and retrieving the data. Commonly, a relational database product, such as DB2 from the International Business Machines Corporation ("IBM"), will be used. However, other products which provide services for managing and accessing data may also be considered as falling within the scope of data servers, including messaging products such as MQSeries and CICS from IBM, as well as other types of middleware. DB2, MQSeries, and CICS are registered trademarks of IBM.

The Java programming language is gaining wide acceptance for writing Web applications, as it is a robust portable object-oriented language defined specifically for the Web environment. ("Java" is a trademark of Sun Microsystems, Inc.) Java attains its portability through use of a specially-designed virtual machine. A Web server that implements a Java virtual machine can be functionally extended using Java "servlets". A servlet is a relatively small executable code object that can be dynamically plugged in, or added, to the code running on the server. Servlets typically perform some specialized function, which can be invoked by the server (or by another servlet) to extend its own functionality. The servlet processes the request, and returns the response to the server (or servlet) that invoked it.

Because Web applications typically have a human user waiting for the response to the client requests, responses must be returned very quickly, or the user will become dissatisfied with the service. Usage volumes for a server may be very large: a particular server may receive thousands, or even millions, of client requests in a day's time. These requests must all be handled with acceptable response times, or the users may switch to a competitor's application services. When the request involves accessing and retrieving data from a backend server, as it normally will, the Web server must first establish a connection to the data server. This connection process may involve sending and receiving a number of messages. For example, a name server might need to be contacted by the Web server, to determine the network address of the desired data server. After receiving a network address, the Web server sends a connection request to the data server. The details of the request depend on the specific type of data server and the networking protocol used to access it, but it is possible that more than one sequence of connection request and connection response messages may need to be exchanged (for example, to negotiate the details of the connection type) between the Web server and the data server before a connection can be completed. When the client request has been completed, the connection must then be disconnected, involving additional message exchanges between the Web server and data server. The messages involved in connecting and disconnecting add a significant amount of overhead to the processing of a client's request, and may greatly outweigh the time actually spent in completing the transaction that answers the client's query.

Accordingly, a need exists for a technique by which these performance problems in the current implementations of Web and data servers can be overcome. The present invention deals with a technique for maintaining connections, after processing of the client request has been completed. Existing connections are maintained in a connection pool. When a client request is received, a connection from the pool is used if a suitable connection is available—thus avoiding the overhead of establishing the connection. (When no connection from the pool can be used, a new connection may be established.) This pool may contain many connections to a single data server, many connections to multiple data servers of a single type (such as multiple DB2 databases), and/or many connections to data servers of different types (for example, DB2 databases, MQSeries message services, etc.). A common interface is used for requesting a connection from the pool, reducing the number of APIs (Application Programming Interfaces) that programmers and support personnel are required to understand and use. This will make working with the pool easier, which will in turn reduce development and support costs.

SUMMARY OF THE INVENTION

An object of the present invention is to provide a technique to improve performance in a Web environment.

Another object of the present invention is to provide a technique whereby multiple connections can be maintained in a connection pool.

It is a further object of the present invention to allow the pooled connections to be of different types, having different characteristics.

It is another object of the present invention to provide access to these pooled connections using a common interface.

It is yet another object of the present invention to provide a technique which optimizes the number and type of connections in the pool at a given time.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process, system, and method for use in a computing environment having a connection to a network, for improving server performance by pooling connections to backend data servers, comprising: an application server; one or more backend data servers; a connection pool; a subprocess for establishing one or more connections, each of said connections connecting said application server to one of said one or more backend data servers; a subprocess for entering said established connections into said connection pool; and a subprocess for managing said entered connections in said connection pool. The process, system, and method preferably further comprise: one or more servlets; a plurality of client requests, each of said requests being executed by one of said servlets; and said subprocess for managing said entered connections in said connection pool further comprises: a subprocess for receiving requests from said one or more servlets, wherein each of said requests is for assignment of a suitable connection and uses a common application programming interface; and a subprocess for assigning said suitable connection to said servlet for use by said servlet. Preferably, said subprocess for assigning said suitable connection further comprises: a subprocess for locating said suitable connection in said connection pool, if available; a subprocess for establishing a new connection, when required; and a subprocess for returning an error when required. Additionally, said subprocess for assigning said suitable connection may further comprise a subprocess for waiting a specified period of time for said suitable connection to become available in said pool. Said subprocess for establishing a new connection may operate when said suitable connection cannot be located in said connection pool, and a maximum pool size has not been reached. Said subprocess for managing said entered connections may further comprise: a subprocess for disconnecting one or more of said connections from said connected backend data server upon detecting that said one or more connections has been idle longer than a maximum idle time; and a subprocess for removing said disconnected connections from said pool. Further, said subprocess for managing said entered connections may comprise: a subprocess for unassigning one or more of said assigned connections from said servlet to which said unassigned connection was assigned, upon detecting that said one or more assigned connections has been unused longer than a maximum time; and a subprocess for making said unassigned connections available in said pool.

The present invention will now be described with reference to the following drawings, in which like reference numbers denote the same element throughout.

DESCRIPTION OF THE PREFERRED EMBODIMENT

Figure 1:
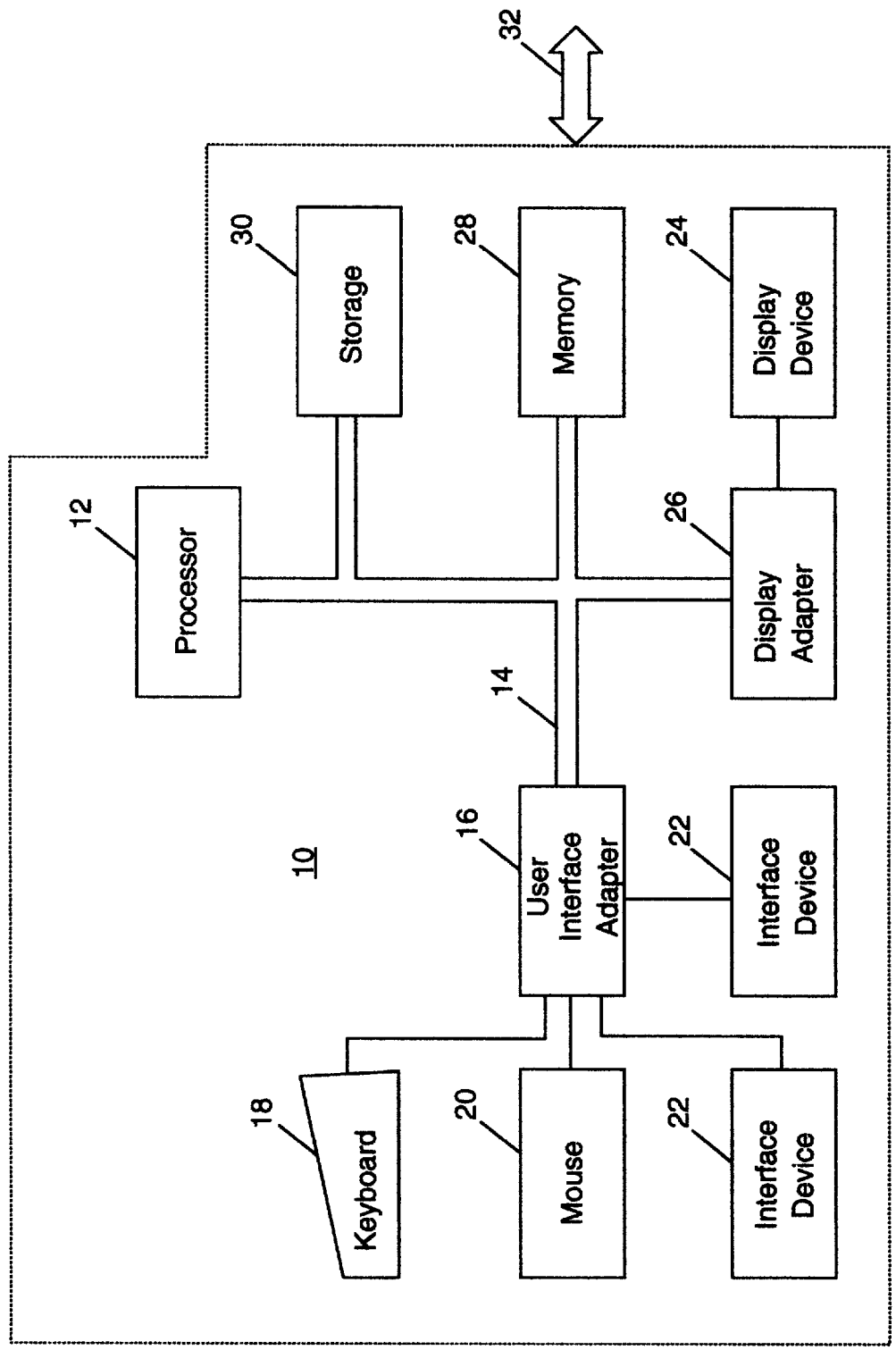
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers.

The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
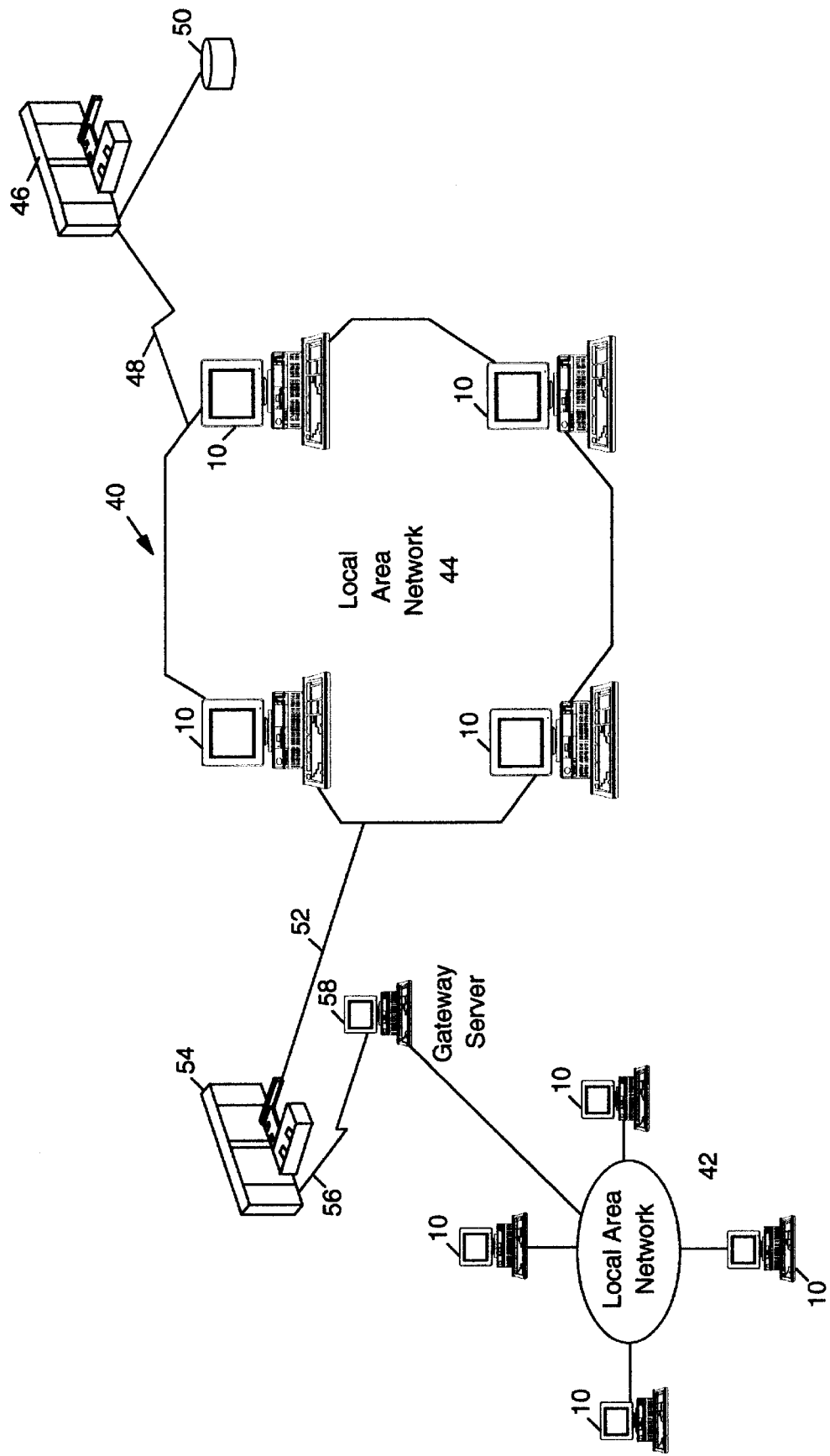
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, smaller computers such as a midrange computer (for example, an Application System/400, also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a Web server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The connection pooling facilities implementing the present invention may be stored on any of the various media types used by the long-term storage 30. This code will typically be installed in a server of the middle tier such as server 46, which processes requests that come from a user having a computer such as the workstation 10.

While servers in Web environments may not typically include a display device 24, the preferred embodiment of the present invention may use a display device 24 in order to allow configuration of parameters (for example, by a Web administrator) that are required for pooling connections. Alternatively, the configuration parameters may be entered using a display device 24 attached to the client machine (such as workstation 10), making use of an Internet connection to pass the configured values to the implementation.

The preferred embodiment of the present invention will now be discussed with reference to FIGS. 3 through 5.

In the preferred embodiment, the present invention is implemented as a computer software program. This program will be used where a client has sent a request for data to a server, and comprises part of the processing done on the server side of the network. Typically, the program will be used in an Internet environment, where the server is a Web server and the request is formatted using HTTP (or HTTPS). Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated. The program code of the preferred embodiment may be implemented as objects in an object-oriented programming language such as Java. Preferably, the connection pooling facilities will be implemented as a Java servlet which extends the functionality of a Java Web server. However, the inventive concepts of the present invention are not limited to implementation in an object-oriented environment, to implementation in the Java language, nor to the particular style of implementation that comprises a servlet. Conventional procedure-oriented languages, such as the "C" programming language, may be used instead of an object-oriented language. Or, a mix of procedural language and object-oriented language programming may be used. The pooling facilities may be implemented as a function or subroutine of the Web server, as functions or subroutines which are invoked by the Web server, etc.

Figure 3:
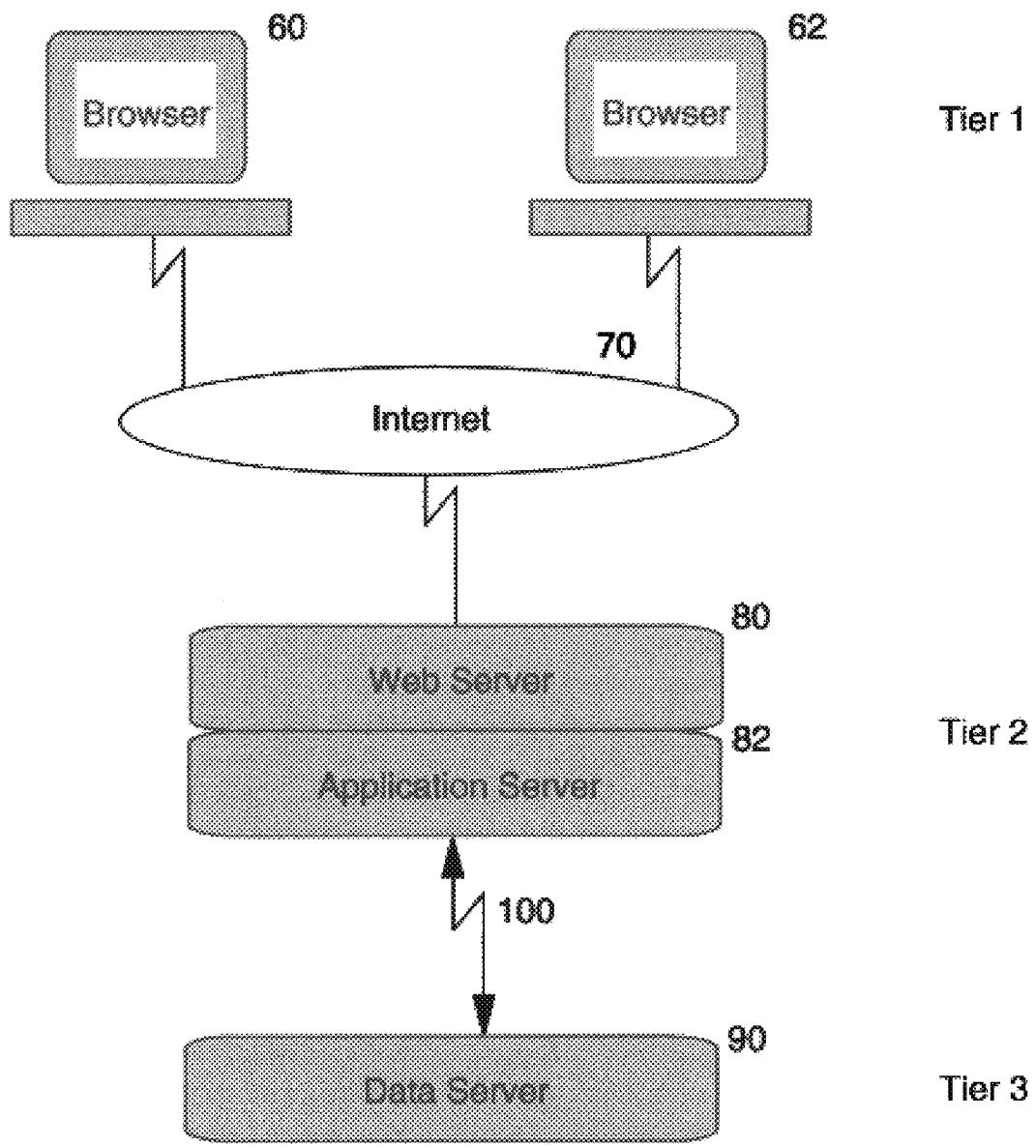
FIG. 3 illustrates the three-tier network environment of the prior art in which the present invention may be used.

FIG. 3 illustrates the three-tiered network environment in which the present invention may be used. One or more client browsers, such as browsers 60 and 62, typically form the first tier. In general, the first tier is where the visual interface of the application software is provided. This interface may be provided in other ways than with browser software. However, for ease of reference, this interface will be referred to herein as making use of a browser. The human user works at the machine on which the browser software runs.

The browsers are connected through the Internet 70, to a Web server such as Web server 80. Although only one Web server 80 is shown in FIG. 3, many servers may exist in a typical configuration. When multiple Web servers are used to balance the load of incoming client requests, a load-balancing host (not shown) may be placed between the Internet 70 and the Web servers, forming what is commonly referred to as a "clustered server"environment. FIG. 3 shows the Web server 80 as including an Application Server 82. The purpose of an application server is to provide the application logic (also commonly referred to as "business logic") that will be used to fulfill the client request. While this Application Server 82 is shown as a distinct component, this is for illustrative purposes only and is not meant to imply that the application services it provides must be separate from the implementation of the Web Server 80. The Web servers, application servers, and load-balancing host (if applicable) comprise Tier 2.

Data servers, such as Data Server 90, comprise Tier 3. As previously stated, these data servers may be relational databases, messaging systems, or any type of middleware which provides data management services that can be accessed by an application. When data from a data server 90 is needed, the Application Server 82 uses a network connection 100 over which messages are sent and received. While FIG. 3 shows a single data server 90 having a single connection 100 to application server 82, there may be many such connections at any given time. Typically, an application server 82 will have many concurrent threads running at one time, where a thread is a single execution of a re-entrant program. Each thread may have its own connection to the data server 90. In this case, the multiple connections originate from a single application server. However, multiple application servers may also connect to one particular data server, where each application server may use threads and therefore have multiple connections. Additionally, one application server 82 may have connections to multiple data servers (including multiple connections to each of the multiple data servers) at a given time. For example, to fulfill a single client request, an application server 82 may need to access a relational database and a messaging service, in which case (at least) two different connections are required.

A three-tier architecture such as that shown in FIG. 3 is generally thought in the art to offer significant advantages in the management and scalability of applications, compared to other architectures such as client-server. However, these advantages do not form part of the present invention, and will not be discussed further herein.

Figure 4:
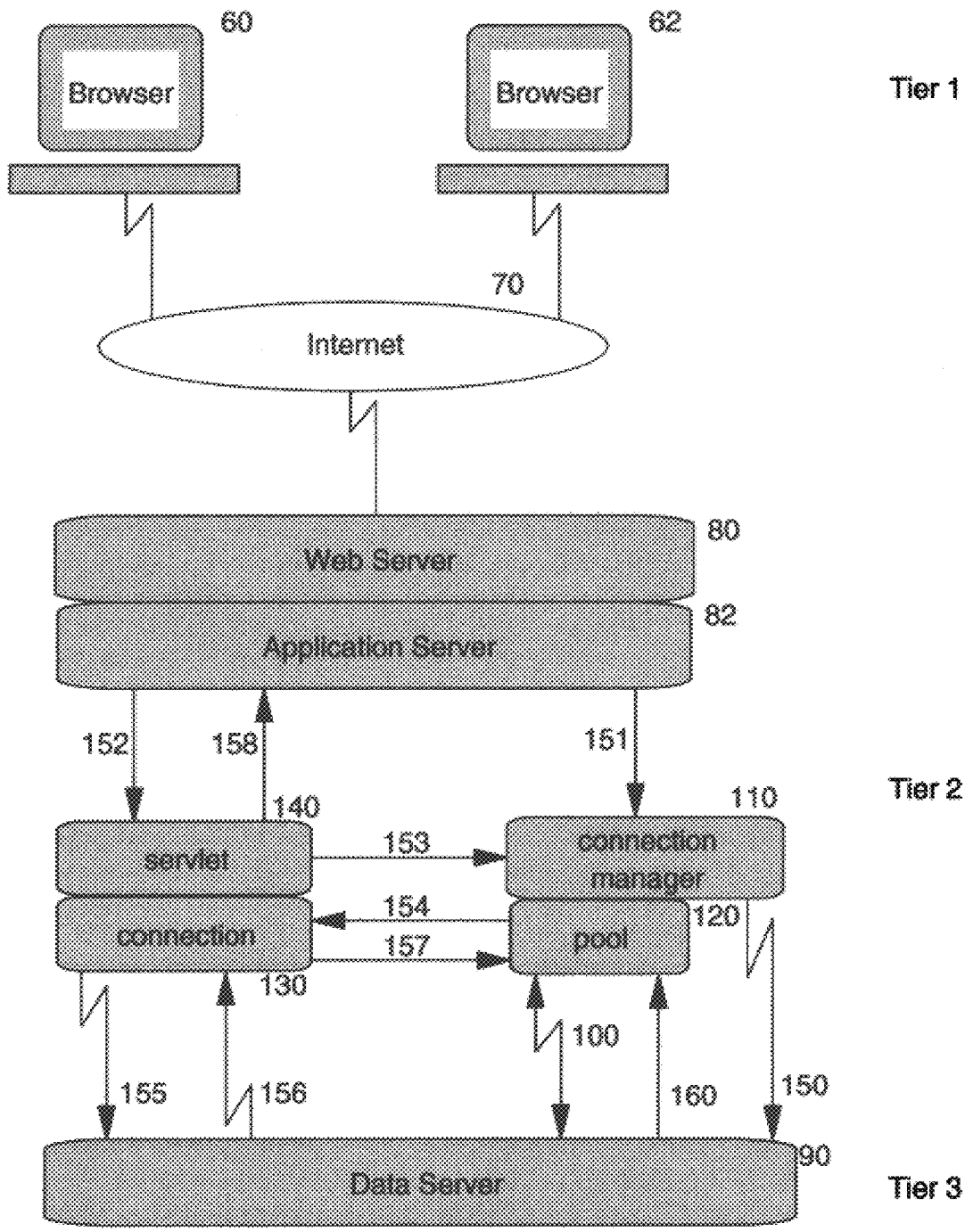
FIG. 4 illustrates the placement of the present invention in the three-tier environment, and shows a preferred flow of activities and messages between components in order to make use of pooled connections.

FIG. 4 shows the preferred placement, within the three-tier architecture, of the facilities which implement the present invention. Further, FIG. 4 shows a preferred flow of activities and messages between these components, which is described below.

Preferably, the facilities which implement the connection pooling technique are located within Tier 2. The pooling technique is provided by what is referred to in FIG. 4 as a "connection manager" 110. The purpose of this connection manager 110 is to manage the pool 120 of already-established connections, provide a suitable connection 130 to a servlet 140 when requested, create new connections (such as connection 150) when required, close connections when necessary, etc. As previously stated, the pool 120 typically contains many connections, which may be to many different types of data servers (such as data server 90). Additionally, multiple connections to one data server may exist in the pool, and these connections may have similar or different characteristics.

By proper management of the connection pool 120, the overhead required to establish a given connection (and later disconnect it) can be spread across many client requests. Instead of creating a new connection for each such request, an existing connection from the pool can be used—eliminating the significant overhead required to set up the connection. When the client request processing has completed, the connection is returned to the connection pool for use by subsequent client requests—eliminating the overhead of disconnecting from the data server. This pooling technique increases the efficiency of processing each individual request, and enables the requests to be completed more quickly.

An additional benefit of this connection pooling technique is that it enables the number of concurrent connections to a data server product to be controlled. A data server product license may specify a maximum number of concurrent users, which may be hard to determine in practice. By configuring the connection manager 110 not to establish more connections than this maximum number, compliance with the license is more easily obtained. (Compliance is not automatically guaranteed by this procedure, however, as there may be other ways to connect to the data server product 90 without going through the connection manager 110.)

The processing activities and message flows involved with using the preferred embodiment of the connection pool for an individual client request are as follows, referring to FIG. 4. At 151, the connection manager 110 (which runs under the Application Server 82) is preferably loaded when the Application Server 82 starts. At 152, a client request coming through the Internet 70 is passed by the Application Server 82 to a servlet 140 for processing. The functionality of the servlet 140 is application-specific, and does not form part of the present invention. If the present invention is implemented in an environment that does not use servlets, then the client request may simply be passed to an application-specific method, subroutine, or function. For ease of reference, it will be assumed that servlets are used. At 153, the servlet 140 uses methods (assuming an object-oriented implementation otherwise, procedures or function calls are used) of the connection manager 110 to ask for a connection (such as 100) from the pool 120. At 154, the connection manager 110 gives the servlet 140 a connection 130 from the pool 120. At 155, the servlet 140 uses the connection 130 to talk directly to the data server 90, using the standard APIs for the specific data server 90. At 156, the data server 90 returns data through the connection 130 to the servlet 140. At 157, after the servlet 140 is through talking to the data server 90, the servlet 140 returns the connection 130 to the pool 120 for use by another client request. At 158, the servlet 140 then sends the response back through the Application Server 82 to the user (at browser 60, for example).

If the servlet 140 asks the connection manager 110 for a connection, and no suitable connection is available, the connection manager 110 may communicate directly with the data server 90 to request a new connection 150. At 160, this new connection 150 is added to the pool 120, and will be returned to the servlet 140 as previously discussed with reference to 154. However, in the preferred embodiment, a maximum number of connections to the data server 90 can be specified, for example as a configuration parameter. Further, an overall maximum number of connections for the pool 120 can be configured. If either of these maximum numbers has already been met, a new connection 150 will not be established. Instead, the servlet's request will either wait until the connection manager 110 identifies an in-use connection that has become available, or the connection manager 110 will return an error to the servlet 140. These possibilities are further discussed below with reference to the "wait-retry" parameter.

Figure 5A:
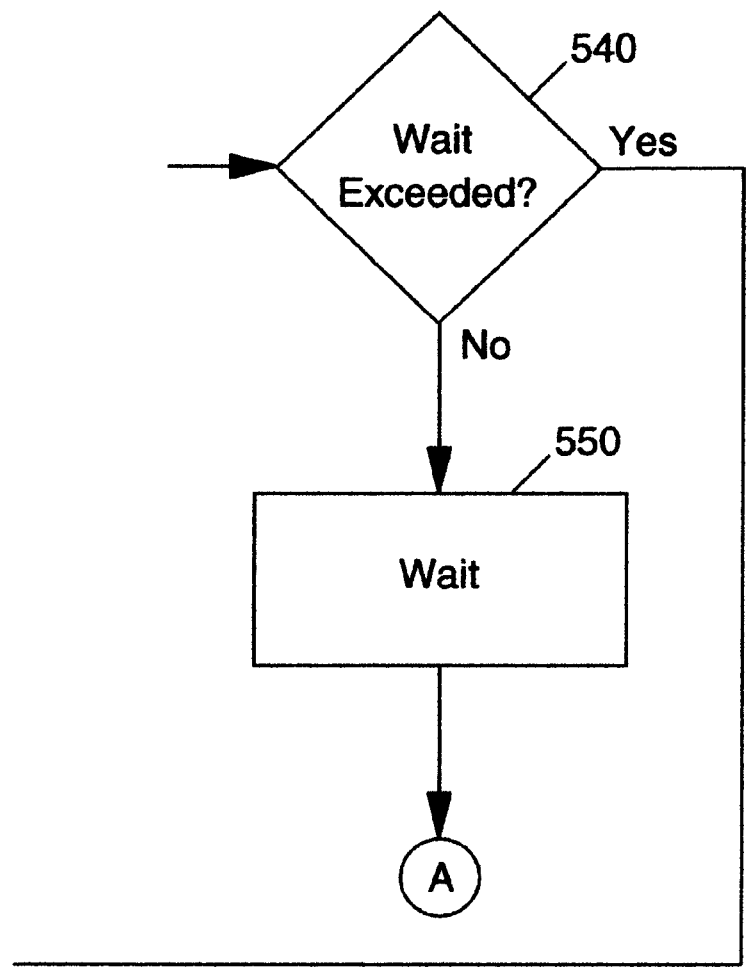
FIG. 5 illustrates a flow chart which sets forth the logic involved with the present invention when a client request is received that requires use of a backend data server.

FIG. 5 illustrates the logic used in a preferred embodiment to process a client request that requires access to a backend data server, and expands upon the activities and flows shown in FIG. 4. The left-hand column of FIG. 5 shows processes that occur in a servlet, and the right-hand column shows processes occurring in the connection manager. At Block 400, a client request arrives at a servlet. (Requests which do not require access to data servers are not pertinent to the present invention, and are not accounted for by the logic of FIG. 5. It will be obvious to one of ordinary skill in the art how to extend the logic of FIG. 5 to include this possibility.)

At Block 410, a request for data services is formatted and sent to the connection manager. As previously stated, one common interface for data servers is used in the preferred embodiment. Each data server may require different information from a servlet, and return different information to that servlet. In order to convey the information required for each specific data server, polymorphism is used. That is, a parameter of the interface is a complex data type that may have different information, depending on the data server to which the request is directed. In an object-oriented language, the term "object" is used to refer to this complex data type. A basic object is defined, according to the present invention, which includes characteristics that will be common across all connection types. This basic object is then further refined by defining a subclass (or "extension", in Java) that adds characteristics specific to each data server type. The basic object will be referred to herein as a "basic connection specification object", and the extended object will be referred to as a "specialized connection specification object". The basic connection specification object has the following attributes: (1) a subpool name, or connection type; and (2) a "wait-retry" flag.

The subpool name or connection type is used to tell the connection manager which data server the servlet wants a connection with. When the pool contains connections to more than one data server, the connection manager will associate information with each connection that identifies the particular data server at the other end of the connection. This can be done by using the concept of logical subpools, where each subpool has connections to only one data server. The subpool name then identifies that data server, and the servlet requests a connection from that subpool to get a connection to that data server. Alternatively, a connection type could be used, where the connection type may be a name, number, or combination of the two. The type information may include identification of the data server, as well as specialized characteristics for the connection such as whether a secure connection is needed. The connection manager then uses this type information to locate a connection having the required characteristics.

The "wait-retry" flag, while not strictly required to achieve the benefits of connection pooling according to the present invention, increases the performance benefits that can be realized. If this flag is set to FALSE (or if this parameter is not used), the connection manager will return an error to the servlet whenever a connection is requested, no suitable connection is currently available, and no more connections can be established. If this flag is set to TRUE, and no suitable connection is available, the connection manager will wait for a specified period of time to pass before responding to the request. This wait period allows time in which in-use connections may become free, and be returned to the pool. If this happens, and one of the returned connections will now satisfy the servlet's request, the connection manager will assign that connection to the servlet. Otherwise, an error will be generated at the end of the wait period.

The values for the basic object are set by the servlet, and any extended attributes of the specialized connection specification object are also formatted, using application-specific procedures. When the complete connection specification object has been created, Block 410 sends this object on the request to the connection manager.

Block 500 indicates that the connection manager receives this request from the servlet. At Block 510, a test is made to determine whether any connections meeting the specified requirements are currently available. The connection manager is responsible for maintaining status information about each connection in the pool, including whether the connection is currently being used. This may be done by associating an "in-use" flag with each connection, where the flag is set to TRUE when a connection is assigned to a servlet, and set to FALSE when the servlet finishes using the connection and returns it to the pool. Block 510 checks only the connections marked as not being in use. If this test has a positive response, control transfers to Block 520; otherwise, control transfers to Block 530.

At Block 520, the suitable connection is marked as now being "in-use", and the connection is assigned to the requesting servlet. Preferably, the connection specification object passed by the servlet will be updated by the connection manager to reflect the address of the connection being assigned. Upon receiving the response from the connection manager at Block 420, the servlet now has the information it needs to use the connection, and it begins doing this in an application-specific manner.

Block 430 asks whether the servlet is done using the connection. If not, the servlet continues using the connection as shown by Block 420; otherwise, the connection is returned to the connection manager at Block 440. It will be obvious to one of ordinary skill in the art that the test at Block 430 is not intended as a repeatedly-executing test, but has been included to signify that the processing flow takes a different path when the servlet has finished using the connection. After returning the connection at Block 440, the connection manager returns it to the pool and marks it as not being in use at Block 570. The processing of this client request (as it relates to the present invention) is then complete, and the processing of FIG. 5 ends.

Block 530 is reached when the test at Block 510 indicated that no suitable connection was found in the pool. Block 530 tests the wait-retry parameter, to see if this servlet is willing to wait for a specified period of time to see if a connection becomes available that meets its needs. If this parameter has been set to FALSE by the servlet, control will transfer to Block 560, where an error will be generated and returned to the servlet. In the Java terminology, the connection manager throws an exception at Block 560. The servlet receives the error indication at Block 450. The processing performed in response to the error is application-specific, using existing techniques that would be invoked when a connection could not be established, and does not form part of the present invention. Following this application-specific processing, the logic flow of FIG. 5 is complete for this client request.

Optionally, additional processing may be included between Blocks 530 and 560, to potentially establish a new connection instead of immediately returning an error. This additional processing may be done when the connection pool has been configured to have a maximum number of connections, and/or a maximum number of connections to a particular data server (which can be thought of as the maximum number in a specific subpool). The number of existing connections would be compared to the configured maximum(s), and if less (indicating that more connections could still be added to the pool or subpool), then the new connection would be established, and control would transfer to Block 520 (to mark this connection as in-use, and return it to the servlet). If the maximum for the pool, or the applicable subpool, was already reached, control would then transfer to Block 560, generating the error condition.

Control reaches Block 540 when the wait-retry parameter was set to TRUE by the servlet. This indicates that the servlet is willing to wait for a specified period of time, as previously stated. The length of time to wait may be specified in a number of alternative ways, without deviating from the inventive concepts of the present invention. For example, the time may be specified as a configuration parameter for the overall connection pool, it may be specified as a parameter for each type of subpool, it may be a static value specified in the connection manager code, or it may be one of the attributes passed by the servlet in the connection specification object. Block 540 asks whether this length of time has been exceeded. If it has, control transfers to Block 560 by following the "Yes" branch from Block 540; otherwise, control transfers to Block 550.

At Block 550, the connection manager will implement a waiting process for this servlet's request. This may be done in several different ways which are known in the art, such as starting a timer that will tick for some or all of the waiting period. If the timer ticks for only part of the waiting period, then the checking process of Blocks 510 through 550 may be repeated multiple times. This increases the likelihood that if a suitable connection does get returned to the pool while the servlet's request is waiting, it will be assigned to the servlet—instead of another servlet that also requests a connection having those characteristics. Instead of using a timer, the connection manager may block the process that is attempting to locate a connection, and fire an event that will unblock the process when a connection is returned to the pool by some other process. Upon completion of whatever technique is used to implement the wait at Block 550, control returns to Block 510 to check the currently-existing pool.

Further optimizations of the process are possible. The maximum connection number processing discussed above with reference to Block 530 and 560 may be repeated as additional processing between Blocks 530 and 540, to enable creation of new connections when the wait-retry parameter was set to TRUE. Alternatively, instead of including this maximum connection number processing in both these places, it could be inserted between Blocks 510 and 530.

The connection manager may optionally seek to optimize the number of connections in the pool at any given time. One way in which this optimization can be implemented is by disconnecting connections that have remained unused for a specified period of time. Preferably, this will be implemented by associating a "last-used" timestamp with each connection, and specifying a "maximum idle time" value for the connection pool (or, alternatively, for each of the logical subpools). Each time a servlet finishes using a connection, the servlet updates the value stored in the last-used timestamp to reflect the current time. The connection manager then periodically invokes a process which inspects each connection marked as not being in use, and compares the last-used timestamp to the current system time. If this difference exceeds the maximum idle time (for the pool, or for the subpool with which this connection is associated, as applicable), then this connection has been idle too long, wasting the resources that may be required to keep the connection open. The idle connection will be disconnected. Optionally, a "minimum number of connections" may be set—again as a parameter of the entire pool, or of each subpool—to prevent too many connections from being released in this process. When a minimum is specified, the comparison process ends whenever the number of existing connections has reached this number.

In yet another optimization, connections that are assigned to servlets may be periodically inspected to ensure that the servlet is still productively using the connection. Preferably, a timestamp value is associated with each connection, which is initially set when the connection is assigned to the servlet, and updated each time the servlet uses the connection. By comparing this value to the current time for an in-use connection, it is possible to determine how much time has elapsed since the servlet last used the connection. A "maximum age" may be set, for the pool or for individual subpools. The elapsed time for a connection is then compared to this maximum age value. When the elapsed time is larger, this is an indication that the servlet may have crashed, hung, etc., and is no longer using the connection. To prevent the connection from being a wasted resource in this situation, the connection manager clears the timestamp, marks the connection as not being in use, and returns it to the pool. To account for the case where the servlet was merely experiencing a long delay in using the connection, but is still actively executing, the servlets may verify whether their connections have been taken away from them in this manner before sending data to the data server. Preferably, this will be done by the servlet invoking a method to ask the connection manager if the servlet still owns the connection. The connection manager is responsible for keeping track of which connections are assigned to which servlets, and will return the appropriate response. If the response indicates that the servlet still owns the connection, the servlet proceeds normally. Otherwise, the connection has been taken away, and the servlet must request a new connection from the connection manager.

When configuration parameters are used, for example to specify the maximum number of connections, or a pool-wide wait-retry value, these values will be entered by a user such as a Web administrator, using techniques which are well known to one of ordinary skill in the art. The configuration process will typically be invoked by selecting a configuration option from an administration interface to the Web server when the Web server 82 is being started. This administration interface may be a graphical user interface accessed on the client machine (Tier 1), from which the configured values will be forwarded to the implementation of the pooling facility using an Internet connection. This process may be repeated as necessary, whenever it is desired to change the existing values of the configured parameters.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. In a computing environment having a connection to a network, computer readable code readable by a computer system in said environment, for improving server performance by managing a pool of network connections to backend data servers, comprising:

an application server;

one or more backend data servers;

a connection pool;

a connection pool manager for managing said connection pool, further comprising:

a subprocess for establishing one or more network connections, each of said network connections connecting said application server to a particular one of said one or more backend data servers;

a subprocess for entering said established connections into said connection pool, wherein each of said entered connections has associated therewith (1) a connection type to identify said particular one and (2) zero or more additional characteristics of said entered connection; and a subprocess for managing said entered connections in said connection pool, further comprising:

a subprocess for receiving a request from a servlet, wherein said request is for assignment of a suitable connection and uses a common application programming interface (API) to said connection pool manager, said common API specifying (1) a desired connection type and (2) zero or more specialized extensions for desired characteristics of said suitable connection; and a subprocess for assigning said suitable connection to said servlet for use by said servlet when said desired connection type and said zero or more desired characteristics in said specialized extensions are available in one of said entered connections.

2. Computer readable code according to claim 1, wherein said subprocess for assigning said suitable connection further comprises:

a subprocess for establishing a new network connection, when said suitable connection cannot be located in said connection pool, and a maximum pool size has not been reached; and a subprocess for returning an error otherwise.

3. Computer readable code according to claim 2, wherein said subprocess for assigning said suitable connection further comprises a subprocess for waiting a specified period of time for said suitable connection to become available in said connection pool, prior to operation of said subprocess for establishing said new network connection, when said request from said servlet specifies a wait-retry parameter using said common API and said parameter has a true value, and wherein said specified period of time may also be specified on said request using said common API.

4. Computer readable code according to claim 2, wherein said subprocess for managing said entered connections further comprises:

a subprocess for disconnecting one or more of said network connections from selected ones of said connected backend data servers upon detecting that said one or more network connections has been idle longer than a maximum idle time; and a subprocess for removing said disconnected connections from said connection pool.

5. Computer readable code according to claim 2, wherein said subprocess for managing said entered connections further comprises:

a subprocess for unassigning one or more of said assigned connections from said servlet to which said unassigned connection was assigned, upon detecting that said one or more assigned connections has been unused longer than a maximum time; and a subprocess for making said unassigned connections available in said connection pool.

6. A system for improving server performance by managing a pool of network connections in a computing environment, comprising:

an application server;
one or more backend data servers;
a connection pool;

a connection pool manager for managing said connection pool, further comprising:

means for establishing one or more network connections, each of said network connections connecting said application server to a particular one of said one or more backend data servers;

means for entering said established connections into said connection pool, wherein each of said entered connections has associated therewith (1) a connection type to identify said particular one and (2) zero or more additional characteristics of said entered connection; and means for managing said entered connections in said connection pool, further comprising:

means for receiving a request from a servlet, wherein said request is for assignment of a suitable connection and uses a common application programming interface (API) to said connection pool manager, said common API specifying (1) a desired connection type and (2) zero or more specialized extensions for desired characteristics of said suitable connection; and means for assigning said suitable connection to said servlet for use by said servlet when said desired connection type and said zero or more desired characteristics in said specialized extensions are available in one of said entered connections.

7. The system according to claim 6, wherein said means for assigning said suitable connection further comprises:

means for establishing a new network connection, when said suitable connection cannot be located in said connection pool, and a maximum pool size has not been reached; and means for returning an error otherwise.

8. The system according to claim 7, wherein said means for assigning said suitable connection further comprises means for waiting a specified period of time for said suitable connection to become available in said connection pool, prior to operation of said means for establishing said new network connection, when said request from said servlet specifies a wait-retry parameter using said common API and said parameter has a true value, and wherein said specified period of time may also be specified on said request using said common API.

9. The system according to claim 7, wherein said means for managing said entered connections further comprises:

means for disconnecting one or more of said network connections from selected ones of said connected backend data servers upon detecting that said one or more network connections has been idle longer than a maximum idle time; and means for removing said disconnected connections from said connection pool.

10. The system according to claim 7, wherein said means for managing said entered connections further comprises:

means for unassigning one or more of said assigned connections from said servlet to which said unassigned connection was assigned, upon detecting that said one or more assigned connections has been unused longer than a maximum time; and means for making said unassigned connections available in said connection pool.

11. A method for improving server performance by managing a connection pool of network connections by a connection pool manager in a computing environment, comprising the steps of:

establishing one or more network connections, each of said network connections connecting an application server to a particular one of one or more backend data servers;

entering said established connections into said connection pool, wherein each of said entered connections has associated therewith (1) a connection type to identify said particular one and (2) zero or more additional characteristics of said entered connection; and managing said entered connections in said connection pool, further comprising the steps of:

receiving a request from a servlet, wherein said request is for assignment of a suitable connection and uses a common application programming interface (API) to said connection pool manager, said common API specifying (1) a desired connection type and (2) zero or more specialized extensions for desired characteristics of said suitable connection; and assigning said suitable connection to said servlet for use by said servlet when said desired connection type and said zero or more desired characteristics in said specialized extensions are available in one of said entered connections.

12. The method according to claim 11, wherein said assigning said suitable connection step further comprises the steps of:

establishing a new network connection, when said suitable connection cannot be located in said connection pool, and a maximum pool size has not been reached; and returning an error otherwise.

13. The method according to claim 12, wherein said assigning said suitable connection step further comprises the step of waiting a specified period of time for said suitable connection to become available in said connection pool, prior to operation of said step of establishing said new network connection, when said request from said servlet specifies a wait-retry parameter using said common API and said parameter has a true value, and wherein said specified period of time may also be specified on said request using said common API.

14. The method according to claim 12, wherein said managing said entered connections step further comprises the steps of:

disconnecting one or more of said network connections from selected ones of said connected backend data servers upon detecting that said one or more network connections has been idle longer than a maximum idle time; and removing said disconnected connections from said connection pool.

15. The method according to claim 12, wherein said managing said entered connections step further comprises the steps of:

unassigning one or more of said assigned connections from said servlet to which said unassigned connection was assigned, upon detecting that said one or more assigned connections has been unused longer than a maximum time; and making said unassigned connections available in said connection pool.

* * * * *